United States Patent
Choi et al.

(10) Patent No.: US 10,893,245 B1
(45) Date of Patent: Jan. 12, 2021

(54) METHOD FOR PROJECTING IMAGE AND ROBOT IMPLEMENTING THE SAME

(71) Applicant: LG ELECTRONICS INC., Seoul (KR)

(72) Inventors: Hyungjin Choi, Seoul (KR); Byungjoon Kim, Seoul (KR); Sul Ran Kim, Seoul (KR); Jongook Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/743,683

(22) Filed: Jan. 15, 2020

(30) Foreign Application Priority Data

Jun. 20, 2019 (WO) ................ PCT/KR2019/007453

(51) Int. Cl.
*H04N 9/31* (2006.01)
(52) U.S. Cl.
CPC ................................. *H04N 9/3173* (2013.01)
(58) Field of Classification Search
CPC .................................................... H04N 9/3173

USPC .......................................................... 348/744
See application file for complete search history.

(56) References Cited

U.S. PATENT DOCUMENTS

| | | | |
|---|---|---|---|
| 2015/0148960 A1* | 5/2015 | Moore | G06K 9/00362 700/259 |
| 2018/0005397 A1* | 1/2018 | Tsai | H04N 5/332 |
| 2019/0099681 A1* | 4/2019 | Rico | B25J 11/003 |
| 2019/0124294 A1* | 4/2019 | Ahn | G06F 3/04845 |

FOREIGN PATENT DOCUMENTS

| | | |
|---|---|---|
| JP | 2007-229855 A | 9/2007 |
| KR | 10-2009-0072038 A | 7/2009 |
| KR | 10-2010-0082559 A | 7/2010 |
| KR | 10-2018-0003269 A | 1/2018 |
| KR | 10-2018-0062130 A | 6/2018 |
| KR | 10-2019-0043749 A | 4/2019 |

* cited by examiner

*Primary Examiner* — Michael Lee
(74) *Attorney, Agent, or Firm* — Birch, Stewart, Kolasch & Birch, LLP

(57) ABSTRACT

Disclosed is a robot projecting an image that selects a projection area in a space based on at least one of first information related to content of an image to be projected and second information related to a user viewing the image to be projected, and projects the image to the projection area.

20 Claims, 10 Drawing Sheets

100

METHOD FOR PROJECTING IMAGE AND ROBOT IMPLEMENTING THE SAME

CROSS-REFERENCE TO RELATED APPLICATION(S)

The present disclosure claims priority to and the benefit of PCT Application No. PCT/KR2019/007453 filed on Jun. 20, 2019, the disclosure of which is incorporated herein by reference in its entirety.

BACKGROUND

1. Field of the Invention

The present disclosure relates to methods for projecting images and robots implementing the same.

2. Description of Related Art

Home robots are recently coming on the market, which are equipped with a display and a projector to provide an imaging service to users.

Projector-equipped robots project and display images on a screen, wall, or ceiling. This enables implementing a home theater.

Meanwhile, an image projection area and an image screen size needs to be optimized according to the type of images and/or the ambient environment of the space where images are projected.

However, conventional projector-equipped robots project images to a preset screen or wall or ceiling closest thereto, thus failing to provide an optimal imaging service.

SUMMARY OF THE INVENTION

An object of the present disclosure is to provide a method of image projection using a robot, which allows the robot to project content under optimal conditions according to the type of the content, and a robot implementing the same.

Another object of the present disclosure is to provide a method of image projection, which may immediately project an image to an area adjacent to the user to thereby provide an image providing service in a convenient way, and a robot implementing the same.

The present disclosure is not limited to the foregoing objectives, but other objects and advantages will be readily appreciated and apparent from the following detailed description of embodiments of the present disclosure. It will also be appreciated that the objects and advantages of the present disclosure may be achieved by the means shown in the claims and combinations thereof.

To address the above-described problems, according to an embodiment of the present disclosure, a robot projects an image via a projector and provides the same to a user, and the robot selects a projection area in a space based on at least one of first information related to content of the image to be projected and second information related to the user viewing the image to be projected.

According to an embodiment of the present disclosure, a robot includes a driving unit (i.e., driving assembly or motor assembly) moving the robot in a space, a projector projecting an image, and a controller selecting a projection area in the space based on at least one of first information related to content of the image to be projected and second information related to a user viewing the image to be projected and controlling the driving unit and the projector to project the image to the projection area.

According to an embodiment of the present disclosure, a robot includes an angle-adjustable body unit (i.e., angle adjustable body assembly or angle adjustable body assembly module), a driving unit moving the body unit within a space, a projector projecting an image and being rotatable and angle-adjustable, and a controller selecting a projection area in the space based on at least one of first information related to content of the image to be projected, second information related to a user viewing the image to be projected, and third information related to a physical feature of one or more projectable areas in the space, determining a first position of the robot to project the image to the projection area based on an illuminance of the space, moving the driving unit to project the image to the projection area in the first position, and adjusting an angle of the projector.

According to an embodiment, a method for projecting an image using a robot includes selecting, by a controller, a projection area within a space based on at least one of first information related to content of an image to be projected and second information related to a user viewing the image to be projected, determining, by the controller, a first position of the robot to project the image to the projection area, moving, by a driving unit, the robot to the first position under control of the controller, and projecting, by a projector, the image in the first position under control of the controller.

The present disclosure may project content under the optimal conditions according to the type of the content, thus delivering increased user convenience.

The present disclosure may immediately project an image to an area adjacent to the user, thus providing an image providing service to the user in a convenient way.

The effects of the present disclosure are not limited thereto, and one of ordinary skill in the art may readily elicit various effects of the present disclosure from the configuration of the present disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Embodiments of the present disclosure are now described with reference to the accompanying drawings in such a detailed manner as to be easily practiced by one of ordinary skill in the art. However, the present disclosure may be implemented in other various forms and is not limited to the embodiments set forth herein.

For clarity of the disclosure, irrelevant parts are removed from the drawings, and similar reference denotations are used to refer to similar elements throughout the specification. Hereinafter, embodiments of the present disclosure are described in detail with reference to the accompanying drawings. The same or substantially the same reference denotations are used to refer to the same or substantially the same elements throughout the specification and the drawings. When determined to make the subject matter of the present disclosure unclear, the detailed of the known art or functions may be skipped.

Such denotations as "first," "second," "A," "B," "(a)," and "(b)," may be used in describing the components of the present disclosure. These denotations are provided merely to distinguish a component from another, and the essence of the components is not limited by the denotations in light of order or sequence. When a component is described as "connected," "coupled," or "linked" to another component, the component may be directly connected or linked to the other component, but it should also be appreciated that other components may be "connected," "coupled," or "linked" between the components.

For illustration purposes, each component may be divided into sub-components. However, the components may be implemented in the same device or module or assembly, or each component may be separately implemented in a plurality of devices or modules.

As used herein, the term "robot" may mean a machine which automatically processes or operates a given task on its own capability. Among others, robots which determine the environment and determine and operate on their own may be called intelligent robots. As used herein, functions performed by the robot include various functions that a moving device may provide, such as vacuuming, guidance, map creation, content providing, and security functions.

Robots may be classified into industrial robots, medical robots, home robots, and military robots according to purposes or use sectors.

A robot includes drivers including actuators or motors and perform various physical operations, e.g., as do robot joints. A movable robot may include wheels, brakes, or propellers in the drivers and drive on roads or fly in the air by way of the drivers.

Figure 1:
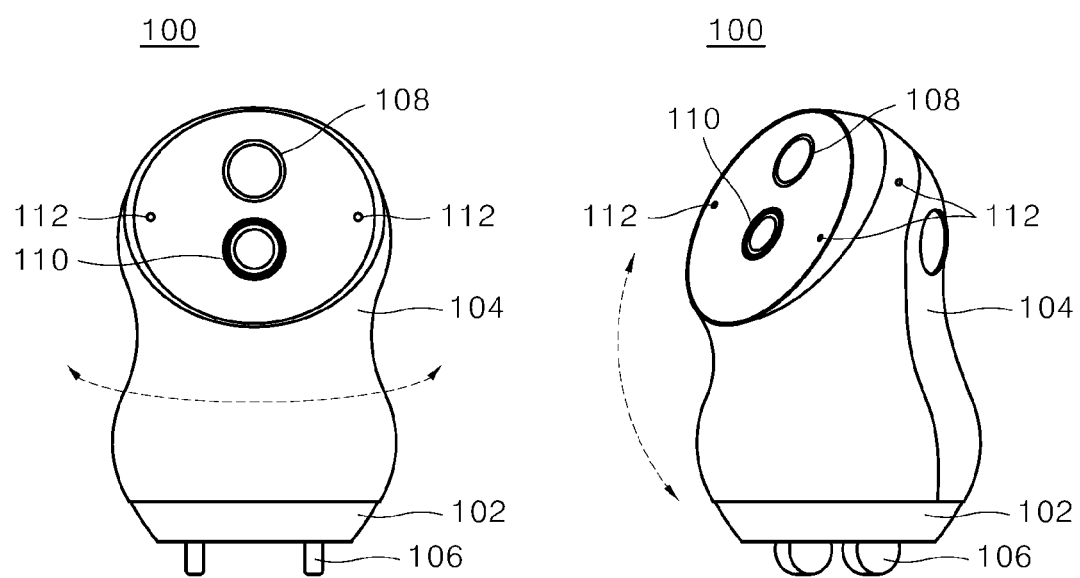
FIG. 1 is a view illustrating an outer appearance of a robot according to an embodiment of the present disclosure.

FIG. 1 is a view illustrating an outer appearance of a robot according to an embodiment of the present disclosure.

Referring to FIG. 1, a robot 100 may move in a specific space and may be a communication robot that may provide the user with information via communication or interactions with the user or lead the user to certain actions.

For example, the robot 100 may be a home robot placed in a home. The home robot may provide various pieces of information to the user via interactions with the user and monitor events that occur in the home.

The robot 100 includes a first body unit (e.g., module, assembly) 102, a second body unit (e.g., module, assembly) 104, a driving unit 106, a camera 108, a projector 110, at least one microphone 112, and a speaker 114.

The first body unit 102 is stationary, and the second body unit 104 turns (e.g., rotates) to the left or right or angles or tilts up or down on the first body unit 102. A description of the relate movement between the first body unit 102 and the second body unit 104 is provided in of KR Publication No. 10-2018-0105105, the entirety of which is incorporated herein by reference.

The driving unit 106 moves the body units 102 and 104.

The camera 108 and the projector 110 may be attached onto the top of the second body unit 104.

The camera 108 obtains an image for a space. In this case, the camera 108 rotates and tilts along with the second body unit 104. Thus, the camera 108 may obtain an omni-directional image for the space.

The projector 110 projects images to a projection area in the space. In this case, the projector 110 also rotates and tilts along with the second body unit 104.

Although not shown in FIG. 1, according to another embodiment of the present disclosure, the second body unit 104 may not rotate or tilt but be stationary, and one of the camera 108 and the projector 110 may rotate or tilt on an outer surface of the stationary second body unit 104.

The plurality of microphones 112 and the speaker 114 are also attached to the second body unit 104.

Figure 2:
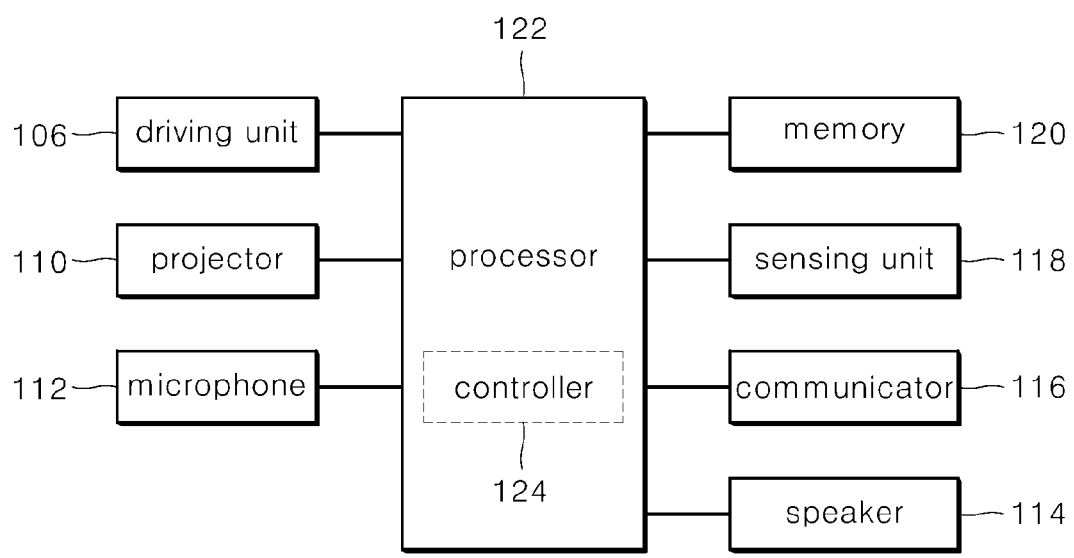
FIG. 2 illustrates the relationship between components of a robot according to an embodiment of the present disclosure.

FIG. 2 is a view illustrating the relationship between components of a robot 100 according to an embodiment of the present disclosure.

Referring to FIG. 2, the robot 100 may include a communicator 116, a sensing unit 118, a memory 120, and a processor 122 in addition to the above-described driving unit 106, projector 110, multiple microphones 112, and speaker 114.

The function of each component is described below.

The driving unit 106 moves the robot 100.

The projector 110 projects images to a projection area in the space. In this case, the images include videos.

In this case, the projected images have a specific type. As an example, the projected images may be a first type of images for performing video call or a second type of images which are content images for the user's entertainment, such as a video. The images may be ones stored in the memory 120 described below or ones received via the communicator 116.

The projector 110 may also rotate or tilt along with the second body unit 104, projecting images to a screen present in the space or the floor, ceiling, or wall of the space.

Meanwhile, according to another embodiment of the present disclosure, where the second body unit 104 is stationary, the projection angle of the projector 110 may be adjusted.

The plurality of microphones 112 receive the user's voice signals or sound signals around the robot 100. Meanwhile, to smoothly or seamlessly obtain external sounds of the robot 100, a plurality of microphone holes may be formed in an outer surface of the second body unit 104. Each microphone hole may be formed in a position corresponding to any one microphone 112, and the microphone 112 may communicate with the outside via the hole. As an example, a sound signal includes information for the number of users present in the space.

The speaker 114 outputs the sound signal of the image projected by the projector 110 and may be provided at any position of the robot 100.

The communicator 116 communicates with an external electronic device, e.g., an external server or an Internet-of-things (IoT) device in the space. To that end, the communicator 116 may include a mobile communication module or a short-range communication module.

The mobile communication module transmits or receives wireless signals to/from at least one of a base station, an external terminal device, or a communication server over a mobile communication network established as per mobile communication standards, protocols, or schemes, such as global system for mobile communication (GSM), code division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or LTE-advanced (LTE-A).

The short-range communication module may be intended for short-range communication and may include at least one of Bluetooth™, radio frequency identification (RFID), infrared data association (IrDA), ultra-wideband (UWB), Zig-Bee™, near-field communication (NFC), wireless-fidelity (Wi-Fi), Wi-Fi Direct, or wireless universal serial bus (USB) technology.

Meanwhile, the external server may be a communication server or an image service providing server, the IoT device may be a lighting device, sound device, or a user personal computer (PC) present in the space.

As an example, the communicator 116 may receive a first type of image from a communication server and a second type of image from an image service providing server or a user PC. Meanwhile, the communicator 116 may transmit an illuminance control instruction to the lighting device and sound data to the sound device.

The sensing unit (i.e., sensing assembly or sensing module) 118 obtains internal information for the robot 100 and ambient environment information for the robot 100 using various sensors. As an example, the sensing unit 118 may include an image sensor corresponding to the camera 108 and may also include a proximity sensor, an illuminance sensor, a touch sensor, an acceleration sensor, a magnetic sensor, a gravity (G) sensor, a gyroscope sensor, a motion sensor, a red-green-blue (RGB) sensor, an infrared (IR) sensor, a fingerprint sensor, an ultrasonic sensor, an optical sensor, a lidar sensor, or a radar sensor, or various combinations thereof.

In particular, the IR sensor, ultrasonic sensor, optical sensor, lidar sensor, and radar sensor may sense position information of one or more objects arranged in the space or position information of the user. The illuminance sensor may measure the illuminance of the space, and the measured illuminance may be used to determine the screen size of the image projected from the projector 110 as described below.

The memory 120 may be a volatile and/or non-volatile memory, store instructions or data related to control of at least one other component of the robot 100, and store a plurality of applications or programs run on the robot 100. In particular, the memory 120 may store the second type of image for entertainment.

The processing module 122 may include one or more of a central processing unit (CPU), an application processor (AP), or a communication processor (CP).

Meanwhile, the controller 124 is implemented as a module inside the processor 122.

The controller 124 may control at least one other component of the robot 100 or may execute computation or data processing regarding communication.

In particular, the controller 124 may control the rotation direction or tilting angle of the second body unit 104, thereby controlling the rotation direction and tilting angle of the camera 108 and the projector 110. Further, the controller 124 may control the driving unit 106 to move the robot 100 and may control the image projection operation of the projector 110.

According to the present disclosure, the controller 124 may select a projection area in a space based on at least one of first information related to content of an image to be projected and second information related to a user viewing the image to be projected.

In this case, the first information may include at least one of type information of the image to be projected and view rating information for the image to be projected. The second information may include at least one of state information of the user to view the image to be projected, position information of one or more objects adjacent to the user, information for the number of users, and view history information for the user viewing the image to be projected.

The state information of the user may be physical state information of the user and may include at least one of position information of the user and face direction information (i.e., face angle information) of the user. The object is an object present within a preset distance of the user. As an example, the object may be a piece of furniture placed in the space.

The controller 124 may select the projection area further based on third information related to a physical feature of each of two or more projectable areas positioned in the space. In this case, the third information may include at least one of the size, material, color, pattern, and irregularity of the projectable areas.

The state information of the user may be obtained based on information sensed by the sensing unit 118 including the camera 108 or the plurality of microphones 112.

Operations of the robot 100 projecting images are described below in greater detail with reference to the drawings.

Figure 3:
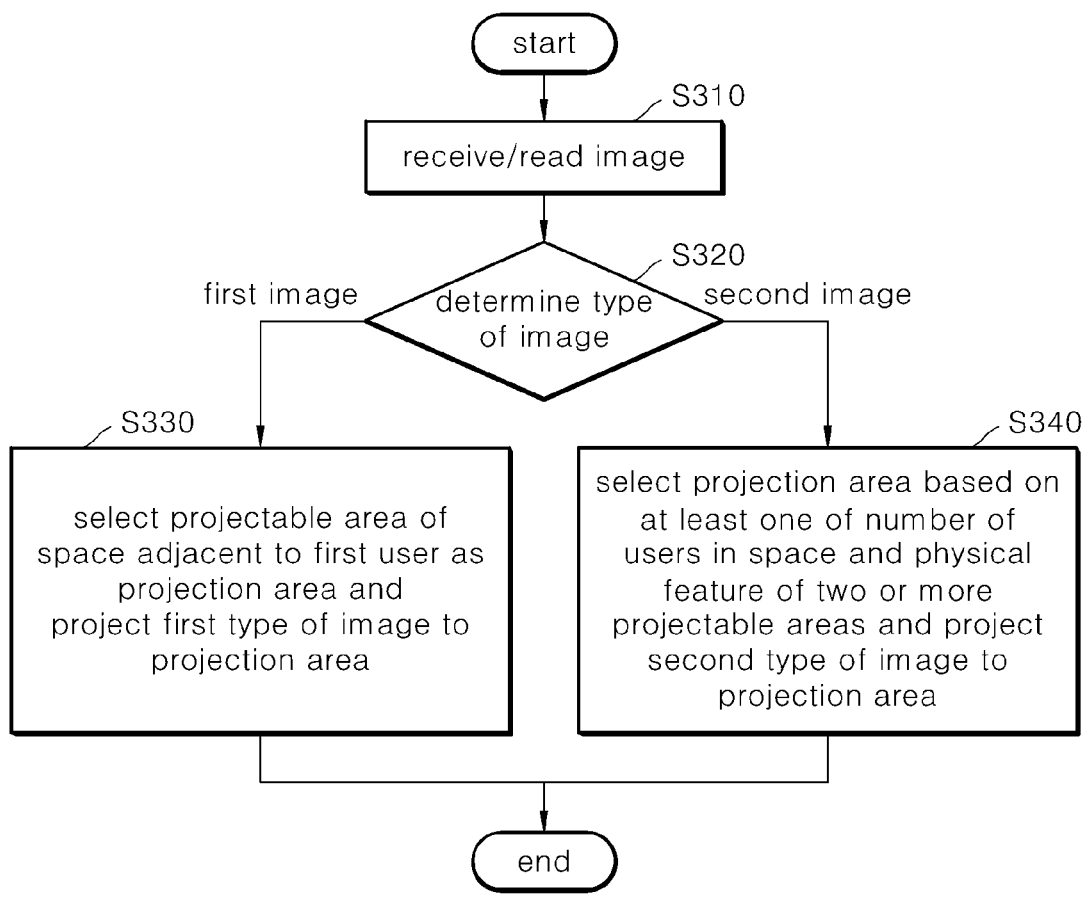
FIGS. 3 and 4 are flowcharts illustrating methods of image projection using a robot according to embodiments of the present disclosure.

FIG. 3 is a flowchart illustrating a method of image projection using a robot 100 according to an embodiment of the present disclosure. Each step of the process is described below in detail.

First, in step S310, the communicator 116 receives an image from an external server.

Meanwhile, where the image is stored in the memory 120, step S302 may be replaced with the step of reading, by the controller 124, the stored image.

Next, in step S320, the controller 124 determines the type of the image. In other words, the controller 124 determines whether the image is of a first type or a second type.

As set forth above, the first type of image may be an image that is preferably projected immediately when received as is an image for video call, and the second type of image may be a content image for the user's entertainment, e.g., a movie, a TV series or any video.

If the image is the first type of image, in step S330, the controller 124 selects a projectable area in a space present within a preset second distance of a first user who is a recipient of video call (i.e., positioned adjacent to the first user) as a projection area and controls the projector 110 to project the first type of image to the projection area.

In other words, the robot 100 moves to the position adjacent to the first user and then projects the first type of image to the selected projection area. In this case, the projection area may be selected using at least one of state information for the first user and information for one or more positions adjacent to the user.

The projection area may correspond to any one of a floor area, wall area, or ceiling area of the space adjacent to the first user.

For example, if the image is the first type of image for video call, and a first user among a plurality of users in a space, who is the recipient of video call, desires to immediately receive video call, then the robot 100 selects a projection area adjacent to the first user using at least one of the state information for the first user and information for one or more positions adjacent to the user and projects the first type of image to the selected projection area. This is described below in greater detail.

Meanwhile, in step S330, the controller 124 may also select the projectable area in the space, which is positioned closest to the robot 100, as the projection area.

In contrast, if the image is the second type of image, in step S340, the controller 124 selects a projection area in the space based on at least one of the number of at least one user to view the image, an image view history and image view rating, and the physical feature of two or more projectable areas in the space, and the controller 124 controls the projector 110 to project the second type of image to the projection area.

According to an embodiment of the present disclosure, if the image is the second type of image, and the second type of image is related to the view history of a second user among the at least one user, the controller 124 may search for a subspace in the space, which is matched with the second user, and select a projectable area in the searched-for subspace as the projection area.

As an example, where the space is a home, the subspace is a room, two or more users including kids are present in the home, and the received second type of image is R-rated (No one under 18 is allowed to watch), the controller 124 may control the robot 100 to project the receives second type of image to a room for adults (e.g., master bedroom) which is matched with the view rating of the second type of image.

Alternatively, where the image is the second type of image, and a view rating is set for the second type of image, the controller 124 may search for a subspace in the space, which is matched with the view rating of the second type of image, and select a projectable area in the searched-for subspace as the projection area.

As an example, where the space is a home, the subspace is a room, two or more users including kids are present in the home, and the received second type of image is R-rated (No one under 18 is allowed/permitted to watch), the controller 124 may control the robot 100 to project the receives second type of image to a room for adults (e.g., a predesignated room, such as the master bedroom, or a room determined to be for adults) which is matched with the view rating of the second type of image.

According to another embodiment of the present disclosure, where the image is the second type of image, the controller 124 may select a projectable area with an area size proportional to the number of users among two or more projectable areas in the space as the projection area.

As an example, if a number of users are in the home, the controller 124 may control the robot 100 to project the received second type of image to a wall of the living room.

Now described below in greater detail are the respective embodiments of steps S330 and S340.

Figure 4:
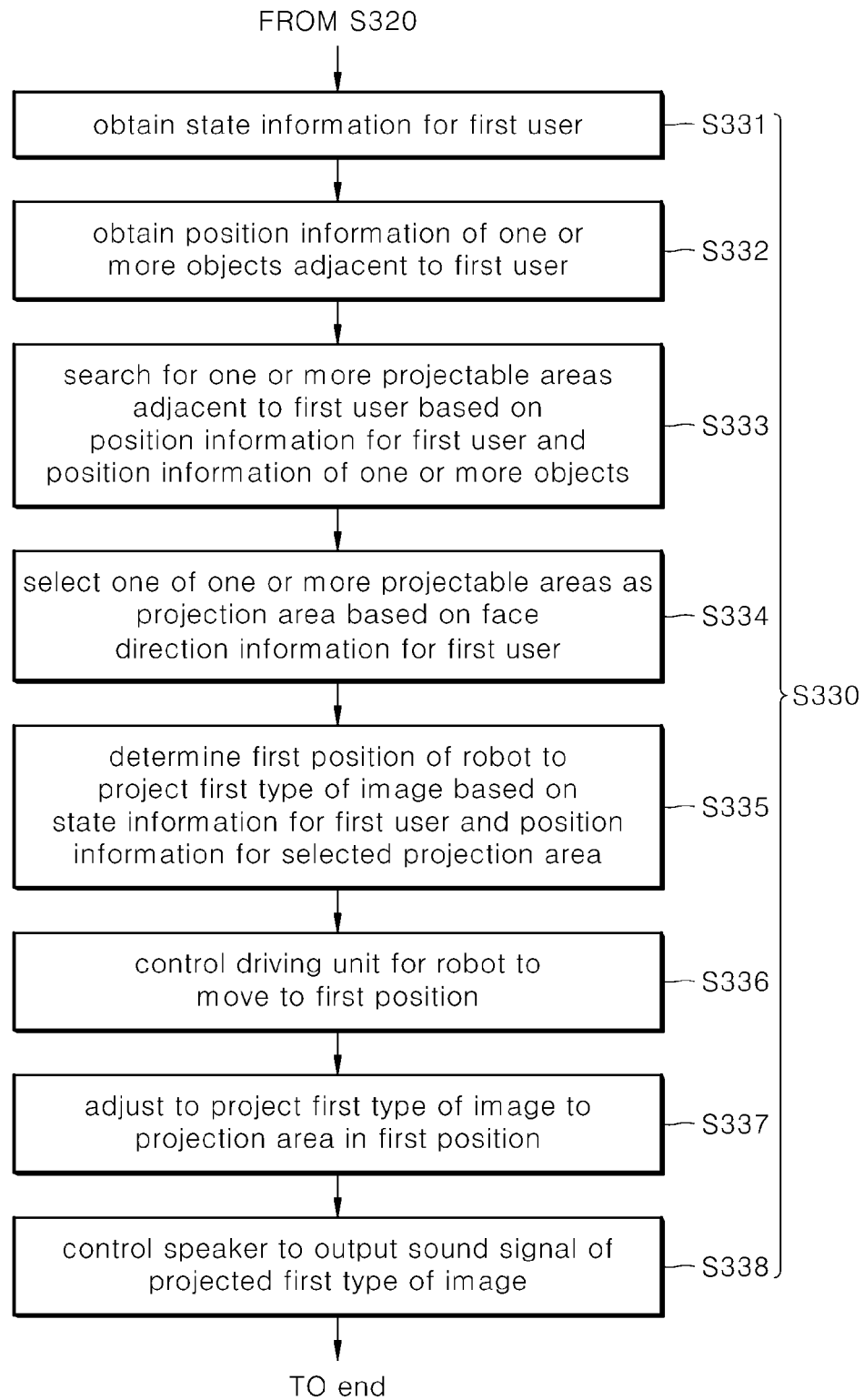
Figure 5:
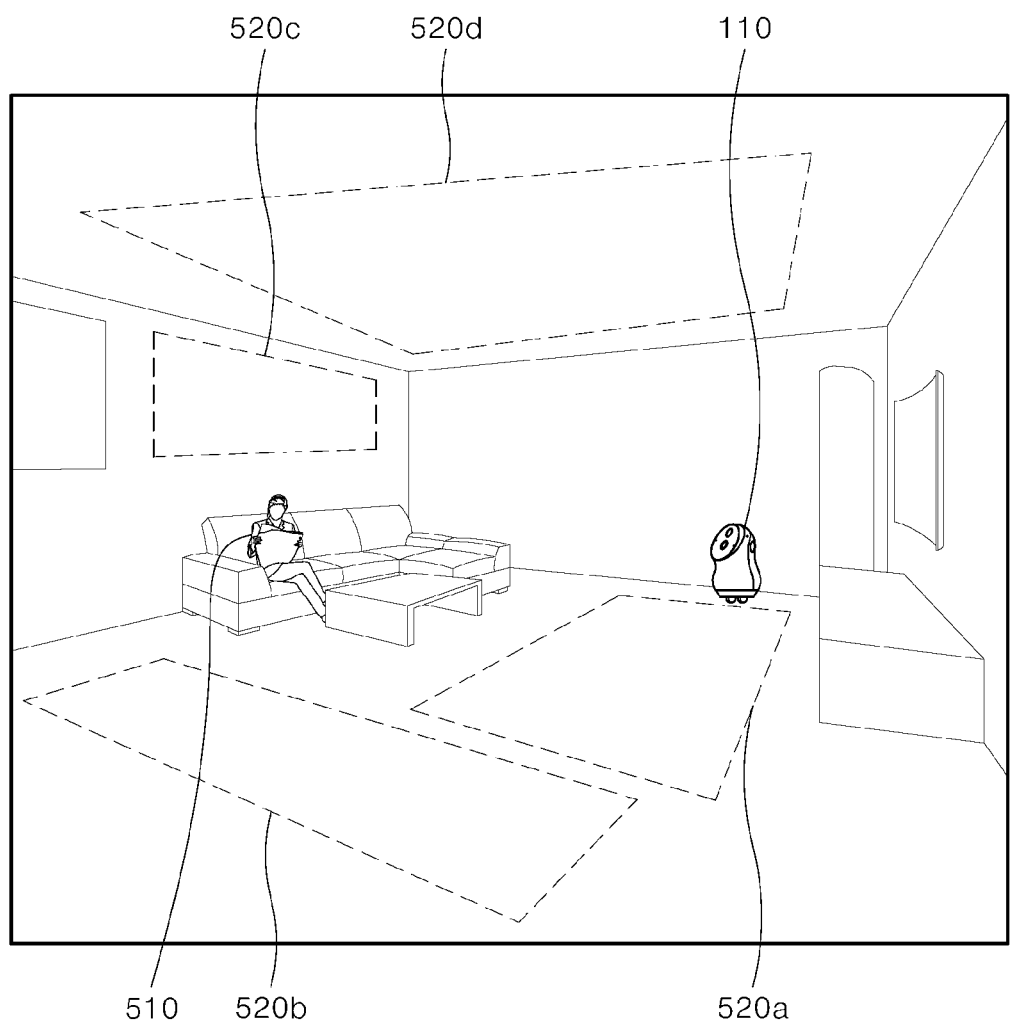
FIGS. 5 and 6 are views illustrating an example projectable area of a space according to an embodiment of the present disclosure.
Figure 6:
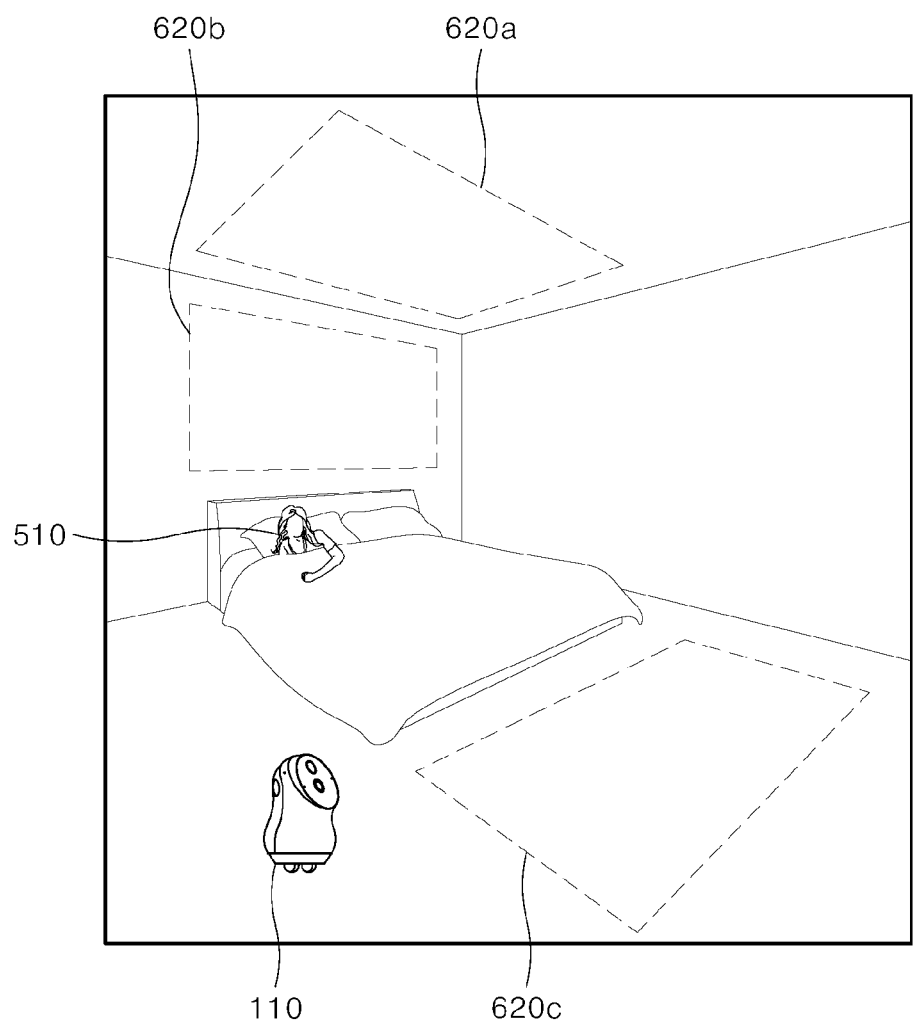
Figure 7:
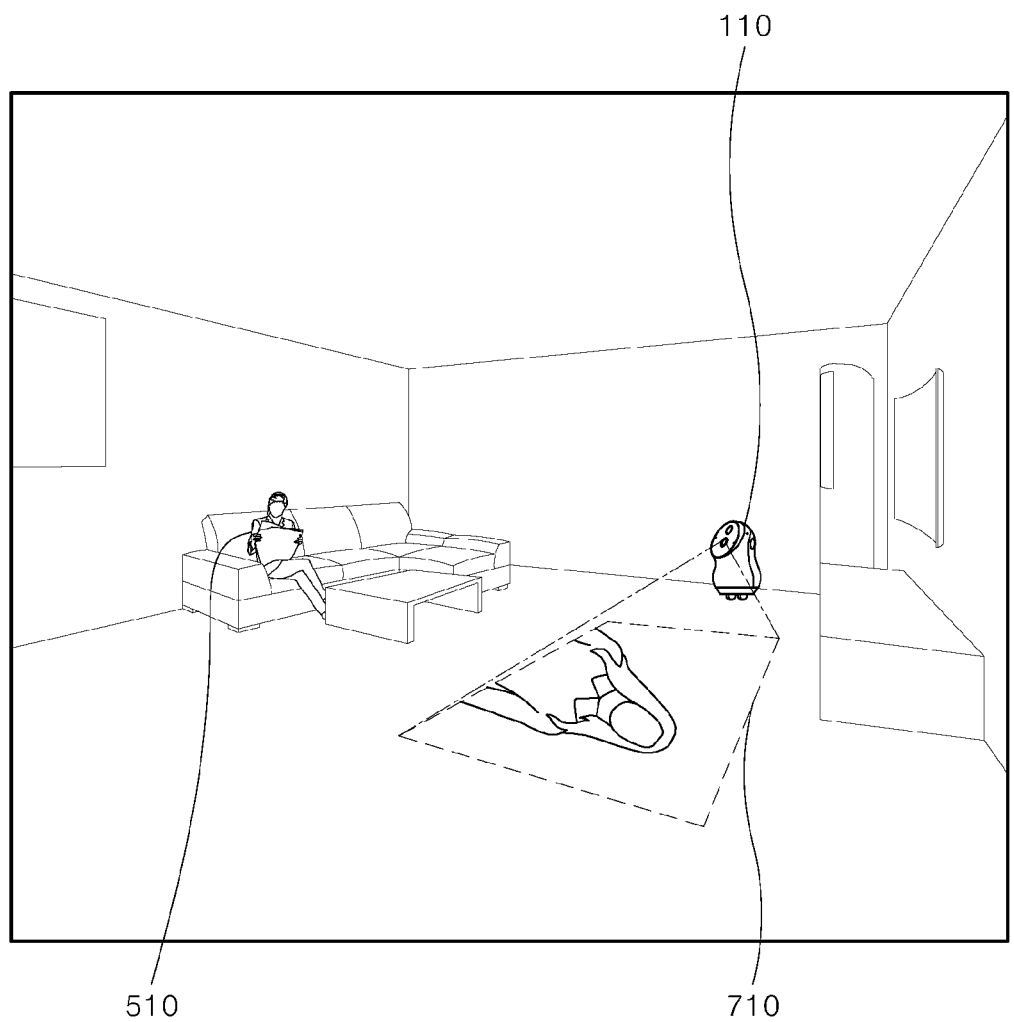
FIGS. 7 and 8 are views illustrating the operation of a robot projecting a first type of image to a projection area according to an embodiment of the present disclosure.
Figure 8:
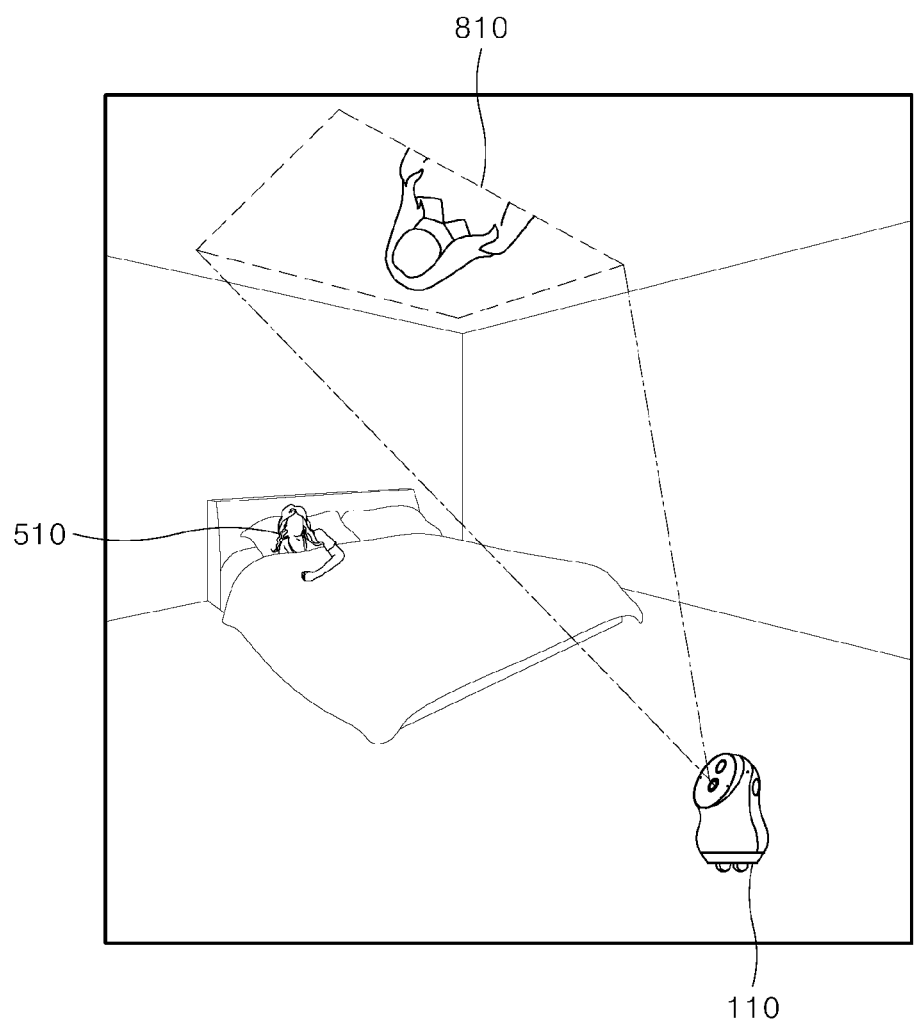

FIG. 4 is a flowchart illustrating an example of step S330 of projecting a first type of image to a position adjacent to a first user who is a recipient of a video call. FIGS. 5 and 6 are views illustrating example projectable areas in a space. FIGS. 7 and 8 are views illustrating operations of a robot 100 projecting a first type of image to a projection area.

Each step is described below with reference to FIGS. 4 to 6.

In step S331, state information for the first user 510 who is the recipient of the video call is obtained. As mentioned above, the state information for the first user 510 may include at least one of position information of the first user 510 and face direction information for the first user 510 (e.g., indicating a direction the face of the user is facing).

According to an embodiment of the present disclosure, the state information for the first user 510 may be obtained based on voice signals of the first user 510 received from a plurality of microphones 112.

Specifically, each of the plurality of microphones 112 may receive a voice signal output from the first user 510, and the controller 124 may calculate the sound pressure level (SPL) of the plurality of voice signals received from the plurality of microphones 112, and the controller 124 may estimate the distance between each microphone 112 and the position where the voice signal has been generated from the plurality of SPLs.

The controller 124 may detect the directions in which the voice signal is generated based on the position of each microphone 112 and the estimated a distance from the first user 510 to the robot 100. In this case, the direction of generation of the voice signal may correspond to the face direction information for the first user 510.

As an example, the controller 124 may detect the direction of generation of the voice signal using, e.g., triangulation based on the position of each microphone 112 and the estimated distance.

As another example, the controller 124 may detect the direction of generation of the voice signal from the first user 510 using the distances between the times when the sound signals received from the plurality of microphones 112 are obtained.

According to another embodiment of the present disclosure, the state information for the first user 510 may be obtained using information sensed by the sensing unit 118. In this case, the sensed information may include image information obtained by the image sensor.

Specifically, the image sensor (e.g., the camera) included in the sensing unit 118 may obtain an image including the first user, and the controller 124 may obtain the position information for the first user 510 in the space by analyzing the obtained image. Further, the controller 124 may estimate the angle of the face of the first user 510, thereby obtaining the face direction information for the first user 510. In this case, preset face-related reference information (e.g., a template or guide) may be put to use.

Or, the controller 124 may obtain the position information for the first user 510 using at least one of an ultrasonic sensor, an optical sensor, a lidar sensor, or a radar sensor, and the controller 124 may obtain the face direction information for the first user 510 using a depth image obtained via the IR sensor.

Meanwhile, the state information for the first user 510 may be obtained using all of the sensors initial interval the sensing unit 118 and the plurality of microphones 112. In this case, more accurate state information for the first user 510 may be obtained.

In step S332, position information of one or more objects adjacent to the first user 510 is obtained.

In this case, at least one of the image sensor, ultrasonic sensor, optical sensor, lidar sensor, and radar sensor included in the sensing unit 118 may be used.

In step S333, the controller 124 searches for one or more projectable areas adjacent to the first user 510 based on the position information for the first user 510 and the position information for the one or more objects.

Here, 'projectable area' means an area to which images may be projected, and a projectable area may be set according to the position of the first user 510 and the position of one or more objects adjacent to the first user 510.

In other words, the projectable area to which an image may be projected may be an area near the first user 510 and may be, e.g., a floor area, wall area, or ceiling area where the one or more objects are not positioned.

Meanwhile, one or more projectable areas may previously be selected and stored in the memory 120 or may be searched for directly by the robot 100 moving immediately before the first type of image is projected.

FIGS. 5 and 6 illustrate a space where two or more projectable areas 520a, 520c, 520d, 620a, 620b, 620c are set.

Referring to FIG. 5, a floor area 520a faced by the first user 510 sitting on a couch, a floor area 520b on a side of the first user 510, a wall area 520c behind the first user 510, and a ceiling area 520d above the first user 510, may be set as projectable areas.

Referring to FIG. 6, a ceiling area 620a faced by a first user 510 lying on a bed, a wall area 620b behind the first user 510, and a floor area 620c adjacent to (and in front of) the first user 510 may be set as projectable areas.

In step S334, the controller 124 selects one of one or more projectable areas as the projection area based on face direction information of the first user 510.

According to an embodiment of the present disclosure, where there is a projectable area positioned in the same direction as the direction of the face of the first user 510 among the one or more projectable areas, the controller 124 selects the projectable area positioned in the same direction as the projection area.

As an example, referring to FIG. 5, a projectable area is present in the floor area 520a faced by the first user 510, in which case, the controller 124 may select the faced floor area 520a in which the first user 510 may view the first type of image without changing the direction of her face as the projection area. That is, the controller 124 may select the projectable area 520a, 520b, 520c, 520d that most closely (or most directly) matches a direction of the face (or facing direction) of the user.

As another example, referring to FIG. 6, a projectable area is present in the ceiling area 620a faced by the first user 510, in which case, the controller 124 may select the faced ceiling area 620a in which the first user 510 may view the first type of image without changing (or with minimally changing) the direction of the face of the user, as the projection area.

According to an embodiment of the present disclosure, where there is no projectable area positioned in the same direction as the direction of the face of the first user 510 among the one or more projectable areas but there is a projectable area positioned on the side of the direction of the face of the first user 510 among the one or more projectable areas, the controller 124 selects the projectable area positioned on the side of the first user 510 as the projection area.

For example, in step S334, the controller 124 may select the projection area considering the convenience of the first user 510 when viewing the first type of image.

Meanwhile, according to another embodiment of the present disclosure, the controller 124 may select one of the one or more projectable areas as the projection area considering the physical features of the one or more projectable areas. Here, the physical features may include at least one of the size (e.g., horizontal and vertical lengths, and thickness), material, color, pattern, and irregularity (but not limited thereto) of the projectable areas.

In other words, the controller 124 may select the projectable area to which the first type of image is projected most clearly as the projection area based on the physical features of the projectable areas. In this case, information for the physical features of the one or more projectable areas may be previously input from the user or may be obtained via the sensing unit 118.

In step S335, the controller 124 determines a first position of the robot 100 to project the first type of image based on the state information for the first user 510 and the position information for the projection area.

According to an embodiment of the present disclosure, the controller 124 may determine the first position to project the first type of image based on the illuminance (i.e., brightness level(s)) of the space. Here, the screen size of the projected image is determined based on the distance between the position of the projection area and the first position.

In other words, if the illuminance of the space is high, such an occasion may arise where the first type of image projected to the floor is unclearly displayed. To prevent such occasion, the controller 124 may determine the first position of the robot 100 to project the first type of image based on the illuminance.

As an example, if the illuminance is high (i.e., high brightness), the controller 124 may designate the first position of the robot 100 close to the position of the projection area and, if the illuminance is low (i.e., low brightness), the controller 124 may designate the first position of the robot 100 away from the position of the projection area.

In operation 336, the controller 124 controls the driving unit 106 to move the robot 100 to the first position.

In step S337, the controller 124 controls the projector 110 to project the first type of image to the projection area in the first position and adjusts the tilting angle of the second body unit 104. In step S338, the controller 124 controls the speaker 114 to output the sound signal of the projected first type of image.

According to an embodiment of the present disclosure, in step S337, the controller 124 may control the projector 110 so that the screen direction of the first type of image is adjusted based on the angle of the face of the first user 510 (i.e., the direction of her face) viewed from the robot 100.

Specifically, the robot 100 preferably projects the first type of image as if it looks in a mirror towards the user's face. Thus, the controller 124 measures the angle of the face of the first user 510 through information obtained via the plurality of microphones 112 and the image sensor (e.g., the camera 108) and controls the projector 110 to adjust the screen direction of the first type of image based on the measured face angle.

FIGS. 7 and 8 illustrate an example in which a first type of image is projected to a projection area 710 and 810 via the projector 110.

Meanwhile, the first user 510 may resize the first type of image projected to the projection area via a specific action.

In other words, the first user 510 may change the size of the first type of image. In this case, the screen size of the projected image may be determined according to the distance between the position of the projection area and the first position. Thus, the controller 124 may change the first position based on the action of the first user 510 and, as the first position is changed, the screen size of the first type of image may be varied. That is, a first position further away from the projection area may cause an increase in the size of the first type of image, and a first position that is closer to the projection area may cause a decrease in the size of the first type of image.

According to an embodiment of the present disclosure, where the first user 510 makes an action to increase the distance between two fingers or between two arms, the controller 124 may change the first position to be away from the projection area. In this case, the increased distance may be proportional to the distance between the first position and the projection area. Thus, the first type of image may be enlarged.

According to another embodiment of the present disclosure, where the first user 510 makes an action to decrease the distance between two fingers or between two arms, the controller 124 may change the first position to be closer to the projection area. In this case, the decreased distance may be proportional to the distance between the first position and the projection area. Thus, the first type of image may be shrunken.

Meanwhile, the first user 510 may change the screen direction of the first type of image projected to the projection area via a specific action.

In other words, such an occasion may occur where the direction of the face of the first user 510 may be changed, in which case the controller 124 may vary the screen direction of the first type of image based on the action of the first user 510.

According to an embodiment of the present disclosure, where the first user 510 rotates the hand, the controller 124 may rotate the screen direction of the first type of image by 90 degrees in the same direction as the rotating direction of the hand.

As an example, where the first user 510 rotates the screen direction of the first type of image by 180 degrees, the first user 510 may make a hand rotating action two times, so that the screen direction of the first type of image is rotated 180 degrees.

Meanwhile, the first user 510 may move while the first type of image is projected. In this case, the controller 124 may change at least one of the first position or the projection area based on the movement of the first user 510, by the information sensed by the sensing unit 118. Thus, the first user 510 may seamlessly view the first type of image.

As an example, the controller 124 may calculate information for the direction in which the first user 510 moves and position information of one or more objects around the moving direction through information obtained via the image sensor, IR sensor, ultrasonic sensor, optical sensor, lidar sensor, or radar sensor, or any combination thereof, and may change at least one of the first position or the projection area so that the first type of image may be projected around the first user 510 based on the calculated information.

Meanwhile, according to an embodiment of the present disclosure, the robot 100 may control the illuminance of an IoT-based lighting device in the space to prevent the context where the first type of image is unclearly displayed. In other words, the controller 124 generates an illuminance control instruction to control the illuminance of the lighting device in the space, the communicator 116 transmits the illuminance control instruction to the lighting device, and the lighting device controls the illuminance through the received illuminance control instruction. As an example, where the illuminance of the space is high, the controller 124 may generate an illuminance control instruction which is an instruction to reduce the illuminance of the space.

Meanwhile, where an IoT-based sound device is present in the space where the first type of image is projected, the sound signal of the first type of image may be output to the sound device. In other words, the communicator 116 may transmit sound data for the projected first type of image to the sound device, and the sound device may output the sound data for the first type of image.

Figure 9:
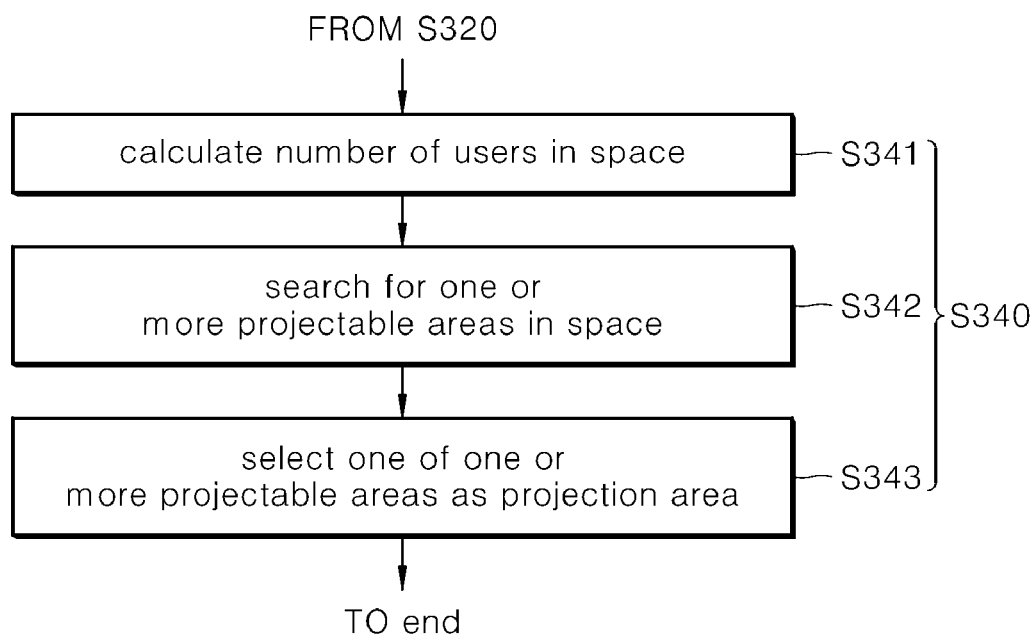
FIGS. 9 and 10 are flowcharts illustrating methods of image projection using a robot according to embodiments of the present disclosure.

FIG. 9 is a flowchart illustrating an example of step S340 of projecting the second type of image based on the physical features of two or more projectable areas and the number of users. Each step is described below with reference to FIG. 7.

In step S341, the controller 124 calculates the number of users in a space.

As an example, the controller 124 may calculate the number of users using an omni-directional image obtained via an image sensor (e.g., the camera 108). As another example, the controller 124 may calculate the number of users based on a second control signal output from one user in the space. In this case, the second control signal may be one output from the user to indicate the number of users present in the space.

In step S342, the controller 124 searches for one or more projectable areas in the space.

In this case, one or more projectable areas may previously be selected and stored in the memory 120 or may be searched for directly by the robot 100 moving immediately before the second type of image is projected.

Meanwhile, the space may include two or more subspaces. As an example, where the space is a home, the subspaces may be a master room, a living room, and a kitchen. In this case, each subspace may have one or more projectable areas.

In step S343, the controller 124 selects one of the one or more projectable areas and selects the selected projectable area as the projection area.

In this case, the controller 124 may select the projection area using the calculated number of users as main information and the physical features of the one or more projectable areas as optional information. Here, the physical features may include at least one of the size (e.g., horizontal and vertical lengths and thickness or thicknesses), material, color, pattern, and irregularity of the projectable areas.

According to another embodiment of the present disclosure, where only the number of users is used in selecting the projection area, the controller 124 selects a projectable area with an area size proportional to the number of users among the one or more projectable areas in the space as the projection area.

In other words, it is preferable that the second type of image is projected to a larger projection area if many people view the second type of image and that the second type of image is projected to a smaller projection area if one or two people view the second type of image. Thus, the controller 124 selects the projection area considering the number of users and the size of the projectable area.

Further, according to an embodiment of the present disclosure, if the number of users and the physical features of one or more projectable areas are all used to select the projection area, a priority is assigned to each of the one or more projectable areas based on the number of users and the physical features of the one or more projectable areas, and the projection area is selected based on the priorities.

Figure 10:
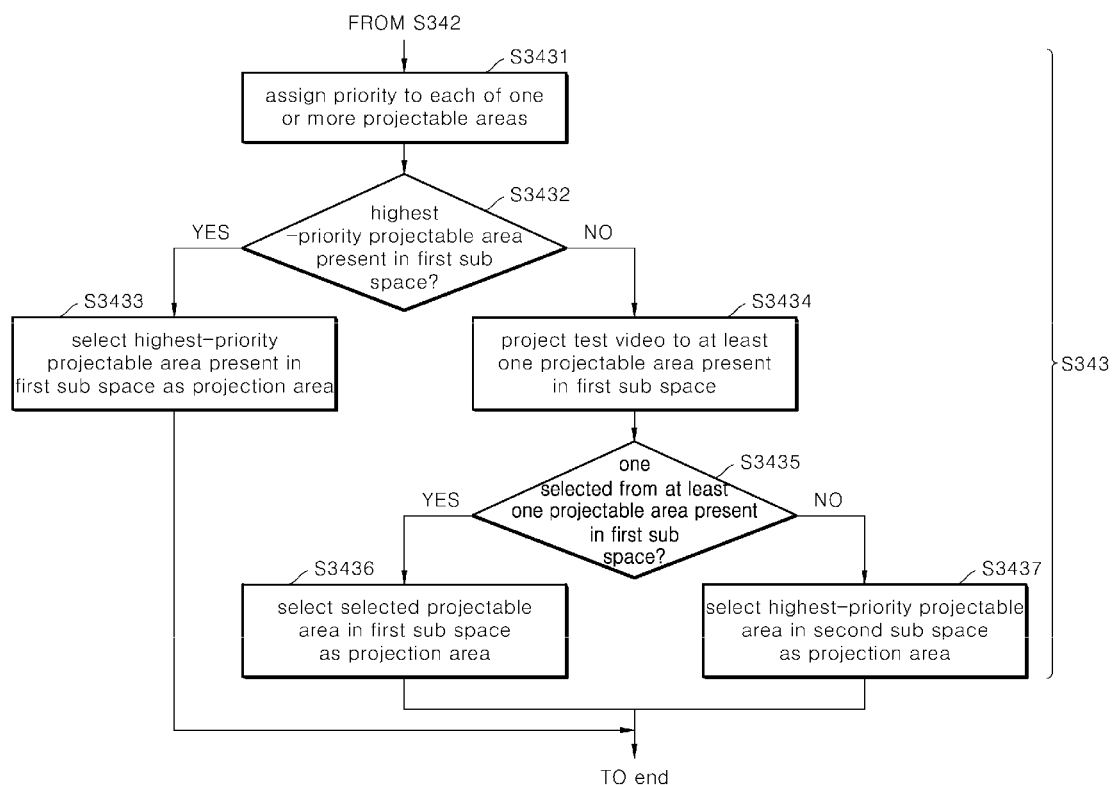

FIG. 10 is a flowchart illustrating detailed steps of step S343 of selecting the projection area according to the priorities according to an embodiment of the present disclosure. In this case, at least one user is assumed to be present in a first subspace.

In step S3431, the controller 124 assigns a priority to each of one or more projectable areas based on the number of users and the physical features of the one or more projectable areas.

As an example, if the surface of the projectable area is white, unpatterned and even, and smooth in texture, the higher priority is assigned to the projectable area while if the surface of the projectable area is black, patterned a lot and uneven, and rough in texture, the lower priority is assigned to the projectable area.

Meanwhile, according to an embodiment of the present disclosure, the controller 124 may calculate the priority of each of the one or more projectable areas using an artificial neural network-based algorithm model.

Artificial intelligence (AI) refers to machine intelligence or methodology for implementing the same. Machine learning refers to methodology for defining and addressing various issues treated in the artificial intelligence sector. Machine learning is oftentimes defined as an algorithm for raising the efficiency of tasks based on continuous experiences for the tasks.

Artificial neural networks (ANNs) are models used in machine learning and may refer to all models which are constituted of artificial neurons (nodes) forming networks and are able to solve problems. An ANN may be defined by a connection pattern between other layers of neurons, a learning process of updating model parameters, and an activation function for generating output.

An ANN may be typically defined by three factors as follows: (1) connection pattern between neurons of different layers; (2) learning process of updating the weight of synapse; and (3) activation function of generating the output value from the weighted sum for the input received from the previous layer.

ANNs may include, but is not limited to, network models, such as the deep neural network (DNN), recurrent neural network (RNN), bidirectional recurrent deep neural network (BRDNN), multilayer perception (MLP), and convolutional neural network (CNN).

ANNs are divided into single-layer neural networks and multi-layer neural networks according to the number of layers.

Normal single-layer neural networks include an input layer and an output layer.

Normal multi-layer neural networks include an input layer, one or more hidden layers, and an output layer.

The input layer is a layer to receive external data, and the number of neurons in the input layer is the same as the number of variables input.

The hidden layers are positioned between the input layer and the output layer, receive signals from the input layer, extract features, and transfer the features to the output layer.

The output layer receives signals from the hidden layers and outputs output values based on the received signals. The input signals between the neurons are multiplied with their respective weights (connection strengths) and are summed up, and, if the sum is larger than the neuron threshold, the neurons are activated, and output values obtained via an activation function are output.

Meanwhile, a deep neural network including a plurality of hidden layers between the input layer and the output layer may be a representative artificial neural network that implements deep learning which is a branch of machine learning technology.

Referring to above, an artificial neural network-based algorithm model of the present disclosure includes an input layer including input nodes, an output layer including output nodes, and one or more hidden layers positioned between the input layer and the output layer and including hidden nodes. In this case, the algorithm model is trained with learning data, and the weights of the edges connecting the nodes and node bias may be updated via training.

The number of users and physical features of one or more projectable areas are input to the input layer of the trained algorithm model, and the priorities of the one or more projectable areas may be output through the output layer of the trained algorithm model.

Referring back to FIG. 10, in step S3432, the controller 124 determines whether the highest-priority projectable area among the one or more projectable areas is present in the first subspace.

If the highest-priority projectable area is present in the first subspace, the controller 124 selects the highest-priority projectable area present in the first subspace as the projection area in step S3433.

In contrast, where the highest-priority projectable area among the one or more projectable areas is not present in the first subspace, the controller 124 controls the projector 110 to project a test image to each of at least one projectable area present in the first subspace in step S3434.

In step S3435, the controller 124 determines whether one of the at least one projectable area present in the first subspace is selected. As an example, the plurality of microphones 112 receive a voice instruction signal for selecting the projectable area output from the user, and the controller 124 determines whether the projectable area is selected based on the received voice instruction signal.

If one of the at least one projectable area is selected, the controller 124 selects the selected projectable area in the first subspace as the projection area in step S3436.

In contrast, if none of the at least one projectable area is selected, the controller 124 selects the highest-priority projectable area in the second subspace as the projection area in step S3437.

In sum, if the image is a second type of image for entertainment, the users desire to view the second type of image in a most efficient way without moving (i.e., without the users moving from their positions). Thus, the robot 100 may efficiently provide the second type of image to the users via projection of the test images and the priorities of one or more projectable areas.

Meanwhile, determination of the first position according to the measured illuminance of the space, adjustment of the illuminance of the IoT-based lighting device, transmission of sound data of the IoT-based sound device, changing of the first position, and changing of the image screen direction described above in connection with step S330 may apply likewise in the instant embodiment.

In sum, the robot 100 of the present disclosure is a device capable of implementing a portable projector and may immediately project images when receiving video call, thereby offering a convenient video call service to the user. Since the robot 100 projects content under the optimal condition according to the type of content, user convenience may be increased.

Although all of the components are described herein as combined into a single one or as operated in combination in the above embodiments, the present disclosure is not limited thereto, but rather, one or more of the components may be optionally combined and operated within the scope of the present disclosure. Further, although all of the components may be implemented in their respective independent hardware components, all or some of the components may be selectively combined to be implemented in a computer program with program modules performing all or some of the functions combined in one or more hardware components. The codes and code segments constituting the computer program may be easily inferred by one of ordinary skill in the art to which the present disclosure pertains. The computer program may be stored in computer readable media and be read and executed by a computer to implement embodiments of the present disclosure. Storage media for the computer program include magnetic recording media, optical recording media, semiconductor recording devices, or other various types of storage media. The computer program implementing embodiments of the present disclosure include program modules transmitted in real-time via an external device.

Although the present disclosure has been described in connection with embodiments thereof, various changes or modifications may be made thereto by one of ordinary skill in the art. Thus, such changes or modifications would be readily appreciated as belonging to the category of the present disclosure without departing from the scope of the present disclosure.

What is claimed is:

1. A robot, comprising:
a motor assembly configured to move the robot in a space;
a projector configured to project an image; and
a controller configured to:
  select a projection area in the space based on the following:
    first information including type information of the image to be projected, and
    second information related to a user to view the image,
  control the motor assembly, and
  control the projector to project the image to the projection area.

2. The robot of claim 1, wherein the controller is further configured to control the motor assembly to move the robot to a first position to project the image to the projection area, and
wherein a screen size of the image is determined according to at least one of the following: a distance between the projection area and the first position of the robot, a position of the projection area, and a number of users in the space.

3. The robot of claim 2, further comprising:
a camera to obtain an omni-directional image of the space; and
a microphone to receive a voice signal from the user,
wherein the controller is further configured to calculate the number of the users based on the obtained omni-directional image and the received voice signal.

4. The robot of claim 1,
wherein the controller is further configured to select one of the following as the projection area when the type information indicates that the image is a video call: a projectable area of the space positioned closest to the user, and a projectable area of the space positioned closest to the robot.

5. The robot of claim 4, wherein the second information includes at least one of the following: position information of the user, a face direction of the user, and position information of one or more objects adjacent to the user,
wherein the position information of the user includes a relative position of the user in the space,
wherein the face direction of the user is a direction of the user's face relative to the robot, and
wherein the controller is further configured to determine a position of the projection area based on a least one of the position information of the user and the position information of the one or more objects, and to control the projector to adjust a screen direction of the image based on the face direction of the user.

6. The robot of claim 5, wherein the controller is further configured to search for one or more projectable areas adjacent to the user based on at least one of the following: the position information of the user and the position information of the one or more objects,
wherein the controller is further configured to select one of the one or more projectable areas positioned in a same direction as the face direction of the user, as the projection area, and
wherein the controller is further configured to select, as the projection area, the projectable area positioned to a side of the user's face when there is no projectable area among the one or more projectable areas positioned in the same direction as the face direction of the user face, and there is a projectable area among the one or more projectable areas positioned to the side of the user's face.

7. The robot of claim 6, wherein the controller is further configured to select the projection area further based on third information related to a physical feature of the one or more projectable areas, and
wherein the physical feature includes at least one of the following: a size of the one or more projectable areas, a material of the one or more projectable areas, a color of the one or more projectable areas and a pattern of the one or more projectable areas.

8. The robot of claim 1, wherein the controller is further configured to determine a change in position of the projection area based on an action performed by the user, and to control the motor assembly to move the robot to resize the image according to the changed position of the projection area.

9. The robot of claim 8, wherein the controller is further configured to increase a size of the projected image corresponding to an increased distance between two fingers of the user or between two arms of the user when the action performed by the user is an increase in distance between the two fingers of the user or is an increase in distance between the two arms of the user, and
wherein the controller is further configured to decrease the size of the projected image corresponding to a decreased distance between the two fingers of the user or between the two arms of the user when the action performed by the user is a decrease in distance between the two fingers of the user, or is a decrease in distance between the two arms of the user.

10. The robot of claim 1, further comprising an image sensor,
wherein the controller is further configured to:
  detect an action by the user; and
  change a screen orientation of the image based on the action.

11. The robot of claim 10, wherein the controller is configured to rotate the screen orientation of the image by 90 degrees in the first direction when the user rotates a hand of the user in a first direction.

12. The robot of claim 1, wherein the type information indicates that the image is a video, and
wherein the controller is further configured to:
  based on view history information of the user included in the second information, determine a subspace in the space and to select a projectable area in the determined subspace as the projection area, or
  based on view rating information set for the video, determine a subspace in the space to select a projectable area in the determined subspace as the projection area.

13. A robot, comprising:
a body assembly;

a motor assembly configured to move the body assembly in a space;
a projector configured to project an image and to be rotatable and angle-adjustable; and
a controller configured to:
select a projection area in the space based on the following:
first information including type information of the image to be projected,
second information related to a user to view the image, and
third information related to a physical feature of one or more projectable areas in the space.

14. The robot of claim 13, further comprising an illuminance sensor,
wherein the illuminance sensor of the robot is configured to detect illuminance of each of the one or more projectable areas, and
wherein the controller is further configured to select the projection area as one of the one or more projectable areas having a lowest illuminance.

15. The robot of claim 13, further comprising an image sensor,
wherein the controller is configured to:
detect an action by the user; and
change a screen orientation of the projected image based on the action.

16. The robot of claim 13, wherein the type information indicates that the image is a video, and
wherein the controller is further configured to:
based on view history information of the user included in the second information, determine a subspace in the space and select a projectable area in the determined subspace as the projection area, or
based on view rating information set for the video, determine a subspace in the space and select a projectable area in the determined subspace as the projection area.

17. The robot of claim 13, wherein the second information includes at least one of the following: position information of the user, a face direction of the user, and position information of one or more objects adjacent to the user,
wherein the position information of the user includes a relative position of the user in the space,
wherein the face direction of the user is a face direction of the user's face relative to the robot, and
wherein the controller is further configured to:
determine a position of the projection area based on a least one of the position information and the position information of the one or more objects; and
control the projector to adjust a screen direction of the image based on the face direction of the user.

18. A method of projecting an image using a robot, the robot including a controller, a projector and a motor assembly, the method comprising:
selecting, by the controller of the robot, a projection area in a space based on first information including type information of an image to be projected and second information related to a user to view the image;
determining, by the controller, a first position of the robot for projecting the image to the projection area;
controlling, by the controller, the motor assembly of the robot to move the robot to the first position; and
controlling, by the controller, the projector to project the image.

19. The method of claim 18, wherein the robot further comprises an image sensor, and
wherein method further comprises:
detecting, by the controller, an action by the user; and
changing a screen orientation of the image based on the action.

20. The method of claim 18, wherein the second information includes at least one of the following: position information of the user, face direction information of the user, and position information of one or more objects adjacent to the user,
wherein the position information of the user includes a relative position of the user in the space,
wherein the face direction information of the user includes a face direction of the user's face relative to the robot, and
wherein the method further comprises:
determining, by the controller, a position of the projection area based on a least one of the position information of the user and the position information of the one or more objects; and
controlling, by the controller, the projector to adjust a screen direction of the image based on the face direction of the user.

* * * * *